United States Patent [19]

DeMartino et al.

[11] Patent Number: 4,835,235

[45] Date of Patent: May 30, 1989

[54] POLYVINYL POLYMERS EXHIBITING NONLINEAR OPTICAL RESPONSE

[75] Inventors: Ronald N. DeMartino, Wayne; Hyun-Nam Yoon, New Providence; James B. Stamatoff, Westfield; Alan Buckley, Berkeley Heights, all of N.J.

[73] Assignee: Hoechst Celanese Corporation, Somerville, N.J.

[21] Appl. No.: 822,094

[22] Filed: Jan. 24, 1986

[51] Int. Cl.$^4$ ............................................. C08F 20/50
[52] U.S. Cl. .................. 526/311; 252/299.01; 526/243; 526/245; 526/246; 526/298; 526/299; 526/288; 526/289
[58] Field of Search ............ 526/243, 245, 246, 288, 526/289, 298, 311, 299

[56] References Cited

U.S. PATENT DOCUMENTS 4,455,368  6/1984  Kojima ........................... 526/298
4,631,328  12/1986  Ringsdorf ....................... 526/259

OTHER PUBLICATIONS

Chem. Abst., 95, 98471p (1981).
Chem. Abst., 97, 110631s (1982).
Chem. Abst., 98, 198932v (1983).

*Primary Examiner*—Christopher Henderson
*Attorney, Agent, or Firm*—DePaoli & O'Brien

[57] ABSTRACT

This invention provides novel polyvinyl polymers which exhibit nonlinear optical response, and which have utility as a transparent optical component in electrooptic light modulator devices.

An invention side chain liquid crystalline polyvinyl polymer is illustrated by poly[6-(4-nitrobiphenyloxy)-hexyl methacrylate]:

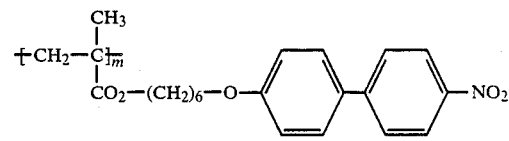

2 Claims, No Drawings

POLYVINYL POLYMERS EXHIBITING NONLINEAR OPTICAL RESPONSE

This invention was made with Government support under Contract Number F49620-85-C-0047 awarded by the Department of Defense. The Federal Government has certain rights in this invention.

CROSS-REFERENCES TO RELATED APPLICATIONS

The subject matter of this patent application is related to that disclosed in patent application Ser. No. 822,090, filed Jan. 24, 1986; patent application Ser. No. 822,092, filed Jan. 24, 1986; and patent application Ser. No. 822,093, filed Jan. 24, 1986.

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above recited publications are incorporated herein by reference.

Of more specific interest with respect to the present invention embodiments is prior art relating to side chain liquid crystalline polymers, such as the five articles published on pages 275–368 of "Polymeric Liquid Crystals", edited by A. Blumstein (Plenum Publishing Corporation, New York, 1985).

U.S. Pat. No. 4,293,435 describes liquid crystalline polymers corresponding to the formula:

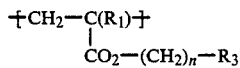

where $R_1$ is hydrogen or methyl, n is an integer from 1 to 6, and $R_3$ represents a structural element containing at least two phenylene groups.

Makromol, 179, 2541(1978) by H. Finkelmann et al describes a model consideration for liquid crystalline polymers with biphenyl groups as mesogenic entities.

J. Polym. Sci., 19, 1427(1981) by Paleos et al describes the synthesis of liquid crystalline polymers which are prepared by the interaction of poly(acryloyl chloride) with mesoogenic compounds such as p-aminobiphenyl.

Eur. Polym. J., 18, 651(1982) describes comb-like liquid crystalline polymers of the smectic and nematic types with cyanobiphenyl groups in the side-chain:

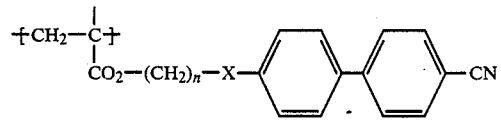

where R is hydrogen or methyl, n is an integer of 2–11, and X is an oxy, alkylene or carbonyloxy divalent radical.

Other publications which describe thermotropic liquid crystalline polymers with side chain induced crystallinity include Polymer, 25, 1342(1984); Eur. Polym. J. 21, No. 7, 645(1985); Polymer 26, 615(1985); and references cited therein.

The above listed publications are incorporated herein by reference.

There is continuing interest in the theory and practice of liquid crystalline polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide novel polyvinyl polymers.

It is another object of this invention to provide thermotropic liquid crystalline polyvinyl polymers having mesogenic side chains which exhibit nonlinear optical response.

It is a further object of this invention to provide electrooptic light modulator devices with a transparent polymeric nonlinear optical component comprising a thermotropic side chain liquid crystalline polyvinyl polymer.

Other objects and advantages of the present invention shall become apparent from the accompanying description and examples.

DESCRIPTION OF THE INVENTION

One or more objects of the present invention are accomplished by the provision of a thermotropic liquid crystalline polymer having a comb structure of mesogenic side chains which comprises at least about 25 weight percent of the polymer, wherein the polymer has a glass transition temperature above about 40° C., and the mesogens exhibit a second order nonlinear optical susceptibility $\beta$ of at least about $5 \times 10^{-30}$ esu as measured at 1.91 $\mu$m excitation wavelength.

In another embodiment, this invention provides a thermotropic liquid crystalline polymer having a comb structure of mesogenic side chains which comprise at least about 25 weight percent of the polymer, wherein the polymer has a glass transition temperature above about 40° C., and the mesogens exhibit a third order nonlinear optical susceptibility $\gamma$ of at least about $1 \times 10^{-36}$ esu as measured at 1.91 µm excitation wavelength.

The main chain of the invention liquid crystalline polymers can be selected from a number of suitable polymerized monomeric and comonomeric structures such as polyvinyl, polysiloxane, polyoxyalkylene, polyester, and the like.

In another embodiment, this invention provides a process for producing a nonlinear optical medium which comprises heating a thermotropic side chain liquid crystalline polymer to form a polymer mesophase, subjecting the polymer mesophase to an external field to induce an orientation of aligned pendant mesogens, and cooling the polymer mesophase of aligned mesogens below the glass transition temperature ($T_g$) while maintaining the external field effect to freeze the mesogen alignment in the solid polymer, wherein the mesogens exhibit a nonlinear optical response.

The aligned solid polymer product thus produced can be modified further by an additional mesogen orientation procedure which comprises heating the said solid polymer product at a temperature between about $T_g$ and $T_g - 30°$ C., subjecting the polymer to an external electric field of at least about $10^4$ volts per centimeter to induce a noncentrosymmetric orientation of aligned mesogens, and cooling the oriented polymer while maintaining the electric field effect to freeze the mesogen alignment in the solid polymer, wherein the mesogens exhibit a second order nonlinear optical response.

In another embodiment, this invention provides an electrooptic light modulator device with a polymeric nonlinear optical component comprising a transparent solid medium of a thermotropic liquid crystalline polymer having a comb structure of mesogenic side chains which comprises at least about 25 weight percent of the polymer, wherein the polymer has a glass transition temperature above about 40° C., and the mesogens exhibit a nonlinear optical response of electronic origin, e.g., a second order nonlinear susceptibility $\beta$ response, or a third order nonlinear susceptibility $\gamma$ response.

An invention electrooptic light modulator device typically will have a transparent solid medium of a thermotropic liquid crystalline polymer which has a stable orientation of an external field-induced alignment of mesogens.

The term "transparent" as employed herein refers to an optical medium which is transparent or light transmitting with respect to incident fundamental light frequencies and created light frequencies. In a nonlinear optical device, a present invention nonlinear optical medium is transparent to both the incident and exit light frequencies.

The present invention further contemplates the following types of novel polymeric compositions.

This invention provides a thermotropic liquid crystalline polymer which is characterized by a recurring monomeric unit corresponding to the formula:

where P is a polymer main chain unit, S is a flexible spacer group having a linear chain length of between about 0-20 atoms, M is a pendant mesogen which exhibits a second order nonlinear optical susceptibility $\beta$ of at least about $20 \times 10^{-30}$ esu as measured at 1.91 µm excitation wavelength, and where the pendant mesogens comprises at least about 10 weight percent of the polymer and have an external field-induced molecular alignment, and the polymer has a glass transition temperature above about 60° C.

In another embodiment, this invention provides a thermotropic liquid crystalline polymer which is characterized by a recurring monomeric unit corresponding to the formula:

where P is a polymer main chain unit, S is a flexible spacer group having a linear chain length of between about 0-20 atoms, M' is a pendant mesogen which exhibits a third order nonlinear optical susceptibility $\gamma$ of at least about $5 \times 10^{-36}$ esu as measured at 1.91 µm excitation wavelength, and wherein the pendant mesogens comprise at least about 10 weight percent of the polymer and have an external field-induced molecular alignment, and the polymer has a glass transition temperature above about 60° C.

In another embodiment, this invention provides a polymer which is characterized by a recurring monomeric unit corresponding to the formula:

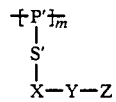

where P' is a polyvinyl main chain; m is an integer of at least 3; S' is a flexible spacer group having a linear chain length of between about 1-25 atoms; X is —NR— or —S—; R is hydrogen or a $C_1$-$C_4$ alkyl group; Y is

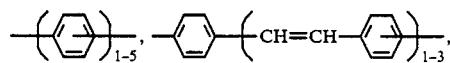

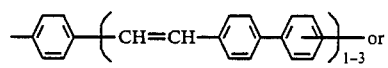

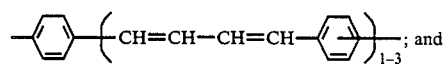

Z is an electron-donating group or an electron-withdrawing group.

Illustrative of the polyvinyl main chain in the above formula is a polymer which contains one or more recurring monomeric units such as acrylate, vinyl halide, vinyl carboxylate, alkene, alkadiene, arylvinyl, and the like. The monomer species are exemplified by methacrylate, vinyl chloride, vinyl acetate, ethylene, propylene, isobutylene, 1-butene, isoprene, styrene, and the like.

The term "electron-donating" as employed herein refers to organic substituents which contribute $\pi$-electrons when the conjugated electronic structure is polarized by the input of electromagnetic energy.

The term "electron-withdrawing" as employed herein refers to electronegative organic substituents which attract $\pi$-electrons when the conjugated electronic structure is polarized by the input of electromagnetic energy.

Illustrative of electron-donating Z groups are amino, alkyl, alkoxy, alkylthio, hydroxy, thiolo, acyloxy, vinyl, halo, and the like.

Illustrative of electron-withdrawing substituents as represented by Z in the above formula are nitro, haloalkyl, cyano, acyl, alkanoyloxy, alkoxysulfonyl, and the like.

In another embodiment, this invention provides a polymer which is characterized by a recurring monomeric unit corresponding to the formula:

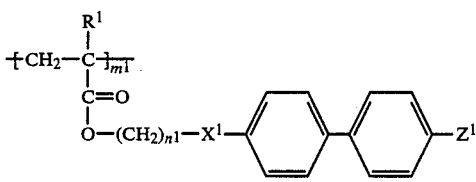

where
$m^1$ is an integer of at least 5;
$n^1$ is an integer between about 4–20;
$X^1$ is —NR$^1$— or —S—;
$R^1$ is hydrogen or methyl; and
$Z^1$ is —NO$_2$, —CN or —CF$_3$.

In another embodiment, this invention provides a thermotropic liquid crystalline polymer which is characterized by a recurring monomeric unit corresponding to the formula:

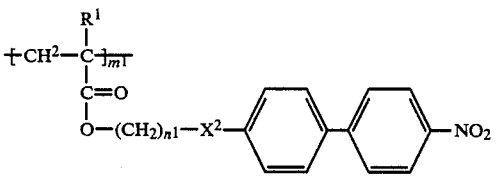

where
$m^1$ is an integer of at least 5;
$n^1$ is an integer between about 4–20;
$X^2$ is —NR$^1$—, —O— or —S—; and
$R^1$ is hydrogen or methyl.

In another embodiment, this invention provides a polymer which is characterized by a recurring monomeric unit corresponding to the formula:

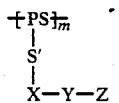

where PS is a main chain polysiloxane polymer; m is an integer of at least 3; S' is a flexible spacer group having a linear chain length of between about 1-25 atoms; X is —NR—, —O— or —S—; R is hydrogen or a C$_1$–C$_4$ alkyl group; Y is

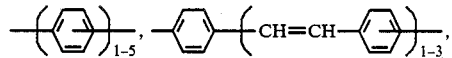

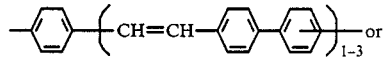

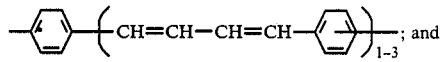

Z is an electron-donating group or an electron-withdrawing group.

In another embodiment, this invention provides a polymer which is characterized by a recurring monomeric unit corresponding to the formula:

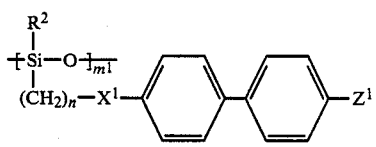

where
$R^2$ is a C$_1$–C$_{10}$ hydrocarbyl group;
$m^1$ is an integer of at least 5;
n is an integer between about 4–20;
$X^1$ is —NR$^1$—, —O— or —S—;
$R^1$ is hydrogen or methyl; and
$Z^1$ is —NO$_2$, —CN or —CF$_3$.

In another embodiment, this invention provides a thermotropic liquid crystalline polymer which is characterized by a recurring monomeric unit corresponding to the formula:

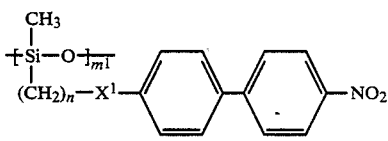

where
$m^1$ is an integer of at least 5;
n is an integer between about 4–20;
$X^1$ is —NR$^1$—, —O— or —S—; and
$R^1$ is hydrogen or methyl.

In another embodiment, this invention provides a polymer which is characterized by a recurring monomeric unit corresponding to the formula:

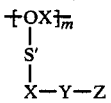

where OX is a main chain polyoxyalkylene polymer; m is an integer of at least 3; S' is a flexible spacer group having a linear chain length of between about 1-25 atoms; X is —NR—, —O— or —S—; R is hydrogen or a C$_1$–C$_4$ alkyl group; Y is

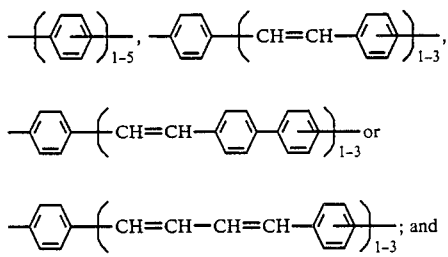

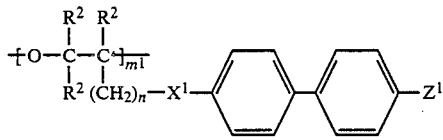

where

Z is an electron-donating group or an electron-withdrawing group.

Illustrative of the main chain polyalkylene polymer is a polymer which contains one or more recurring monomeric units such as oxyethylene, oxypropylene, oxybutylene, oxyisobutylene, oxyphenylethylene, oxycyclohexylethylene, and the like.

In another embodiment, this invention provides a polymer which is characterized by a recurring monomeric unit corresponding to the formula:

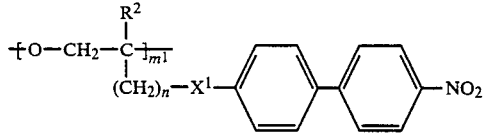

where
$R^2$ is hydrogen or a $C_1$-$C_4$ alkyl group;
$m^1$ is an integer of at least 5;
n is an integer between about 4-20;
$X^1$ is —$NR^1$—, —O— or —S—;
$R^1$ is hydrogen or methyl; and
$Z^1$ is —$NO_2$, —CN or —$CF_3$.

In another embodiment, this invention provides a thermotropic liquid crystalline polymer which is characterized by a recurring monomeric unit corresponding to the formula:

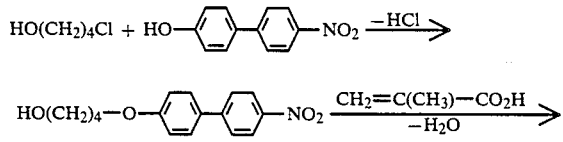

where
$R^2$ is hydrogen or a $C_1$-$C_4$ alkyl group;
$m^1$ is an integer of at least 5;
n is an integer between about 4-20;
$X^1$ is —$NR^1$, —O— or —S—; and
$R^1$ is hydrogen or methyl.

Synthesis Of Liquid Crystalline Polymers

The preparation of a polyvinyl liquid crystalline polymer with mesogenic side chains is illustrated by the following flow diagram:

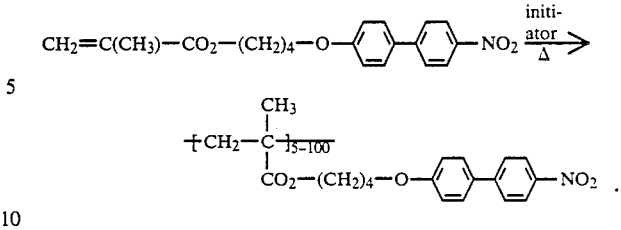

The preparation of a polysiloxane liquid crystalline polymer with mesogenic side chains is illustrated by the following flow diagram of a reaction between an organohydrogenpolysiloxane and a vinyl-substituted mesogenic compound:

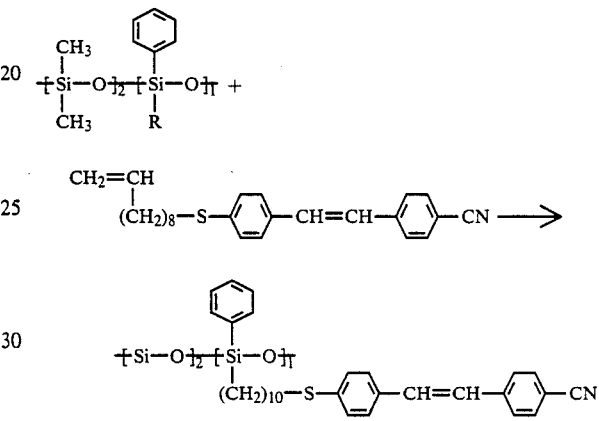

The average number of silicon atoms in the organopolysiloxane main chain can vary in the range between about 3-3000.

Polysiloxane liquid crystalline polymers with mesogenic side chains are described in U.S. Pat. Nos. 4,358,391; 4,388,453; and 4,410,570; and in publications such as Makromol. Chem., Rapid Commun. 3, 557(1982); and 5, 287(1984); incorporated herein by reference.

The preparation of a polyoxyalkylene liquid crystalline polymer with mesogenic side chains is illustrated by the following polymerization reaction:

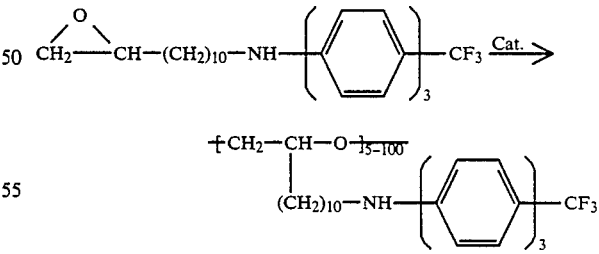

Nonlinear Optical Properties

The fundamental concepts of nonlinear optics and their relationship to chemical structures can be expressed in terms of dipolar approximation with respect to the polarization induced in an atom or molecule by an external field.

As summarized in the ACS Symposium Series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a liquid crystalline domain:

$$\Delta\mu = \mu_e - \mu_g = \alpha E + \beta EE + \gamma EEE + \quad (1)$$

$$P = P_O + \chi^{(1)} E + \chi^{(2)} EE + \chi^{(3)} EEE + \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave. Birefringent crystals often possess propagation directions in which the refractive index for the fundamental $\omega$ and the second harmonic $2\omega$ are identical so that dispersion may be overcome.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the natural dispersion, i.e., the optical transmission of fundamental and second harmonic frequencies is phase matched in the medium. The phase matching can provide a high conversion percentage of the incident light to the second harmonic wave.

For the general case of parametric wave mixing, the phase matching condition is expressed by the relationship:

$$n_1\omega_1 + n_2\omega_2 = n_3\omega_3$$

where $n_1$ and $n_2$ are the indexes of refraction for the incident fundamental radiation, $n_3$ is the index of refraction for the created radiation, $\omega_1$ and $\omega_2$ are the frequencies of the incident fundamental radiation and $\omega_3$ is the frequency of the created radiation. More particularly, for second harmonic generation, wherein $\omega_1$ and $\omega_2$ are the same frequency $\omega$, and $\omega_3$ is the created second harmonic frequency, $2\omega$, the phase matching condition is expressed by the relationship:

$$n_\omega = n_{2\omega}$$

where $n_\omega$ and $n_{2\omega}$ are indexes of refraction for the incident fundamental and created second harmonic light waves, respectively. More detailed theoretical aspects are described in "Quantum Electronics" by A. Yariv, chapters 16-17 (Wiley and Sons, New York, 1975).

A present invention liquid crystalline polymer substrate typically is optically transparent and exhibits hyperpolarization tensor properties such as second harmonic and third harmonic generation, and the linear electrooptic (Pockels) effect. For second harmonic generation, the bulk phase of the liquid crystalline polymer substrate whether liquid or solid does not possess a real or orientational average inversion center. The substrate is a macroscopic noncentrosymmetric structure.

Harmonic generation measurements relative to quartz can be performed to establish the value of second order and third order nonlinear susceptibility of the optically clear substrates.

In the case of macroscopic nonlinear optical substrates that are composed of noncentrosymmetric sites on the molecular and domain level, the macroscopic second order nonlinear optical response $\chi^{(2)}$ is comprised of the corresponding molecular nonlinear optical response $\beta$. In the rigid lattice gas approximation, the macroscopic susceptibility $\chi^{(2)}$ is expressed by the following relationship:

$$\chi_{ijk}(-\omega_3; \omega_1,\omega_2) = N f^{\omega_3} f^{\omega_2} f^{\omega_1} < \beta_{ijk}(-\omega_3; \omega_1,\omega_2) >$$

wherein N is the number of sites per unit volume, f represent small local field correlations, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq. Cryst., 106, 219 (1984); incorporated by reference.

External Field Induced Liquid Crystal Orientation

The term "external field" as employed herein refers to an electric, magnetic or mechanical stress field which is applied to a substrate of mobile organic molecules, to induce dipolar alignment of the molecules parallel to the field.

Liquid crystals (including polymeric liquid crystals) may be aligned by the application of an external field to a matrix of liquid crystal molecules. The degree of orientation is determined by the orientational order parameter. For both nematic and smectic mesophases, the parameter is defined in terms of a director which is a vector parallel to the molecular long axis (and perpendicular to the plane of molecular layering in the case of the smectic mesophase).

If theta is defined as the angle between the director and a chosen axis, then the orientational order parameter is defined as the average over all molecules of the second Legendre polynomial. The parameter ranges from $-0.5$ to $1.0$ ($1.0$ corresponds to perfect uniaxial alignment along a given axis. $0.0$ corresponds to random orientation, and $-0.5$ corresponds to random orientation confined in a plane perpendicular to a given axis).

The order parameter thus defined does not distinguish between parallel and antiparallel alignment. Thus, a sample of asymmetric rod-like molecules would have an order parameter of 1.0 for both the case in which the molecules are colinear and all pointed in the same direction, and the case in which the molecules are colinear and form antiparallel pairs.

The application of an orienting external field to an array of nematic liquid crystal molecules results in an order parameter of approximately 0.65. Deviations from ideal order are due to nematic fluctuations on a micron length scale which accommodate characteristic defects. These fluctuations may be dynamic for small molecule liquid crystals or frozen for polymeric liquid crystals. In either case, nematic fluctuations scatter light so that aligned samples appear to be hazy (particularly in a thick sample).

Smectic liquid crystals may be aligned by application of an orienting external field, with a resulting order parameter exceeding 0.9. Unlike the nematic phase, characteristic defects are removed upon aligning the smectic phase and thereby forming a single liquid crystal phase. Such phases are known as monodomains and, because there are no defects, are optically clear.

For both the nematic and smectic mesophases, application of a DC electric field produces orientation by torque due to the interaction of the applied electric field and the net molecular dipole moment. The molecular dipole moment is due to both the permanent dipole moment (i.e., the separation of fixed positive and negative charge) and the induced dipole moment (i.e., the separation of positive and negative charge by the applied field).

The torque which results by the application of a DC electric field normally would only produce very slight alignment even for high dipolar and polarizable molecules at room temperature. The alignment torque is negligible in comparison with the disordering effect of thermally induced rotation (i.e., the Boltzman distribution of rotational eigenstates at room temperature). However, due to the unique associations developed by liquid crystalline molecules through intermolecular forces, long range orientational order on a micron length scale is present. Under these conditions, bulk orientation of the sample by application of aligning fields exceeding a few volts/cm can produce the degrees of alignment indicated above.

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed for the nematic phase. At these frequencies, rotational motion of aligned nematic regions is not sufficient to follow the field. As a direct result, torque due to the interaction of the applied field and any permanent dipole moment over time averages to zero. However, electronically induced polarization is a very rapid process so that the induced dipole moment changes direction depending upon the direction of the applied field resulting in a net torque.

Application of a magnetic field also can effect alignment. Organic molecules do not possess a permanent magnetic dipole moment. In a manner analogous to AC electric field, a magnetic field can induce a net magnetic dipole moment. Torque results from the interaction of the induced dipole moment and the external magnetic field. Magnetic field strengths exceeding 10 Kgauss are sufficient to induce alignment for a nematic phase.

Alignment of nematics by electric or magnetic fields are accomplished simply by application of the field to the nematic material. Alignment of the smectic phase is more difficult due to a higher viscosity which decreases rotational freedom. Formation of aligned smectic monodomains can be achieved by orienting a material in the nematic phase, and cooling the material into the smectic phase while maintaining the aligning field. For materials which have only smectic and isotropic phases and which lack a nematic phase, alignment can be accomplished in the smectic phase at an elevated temperature near the smectic to isotropic transition temperature, e.g., sufficiently close to the transition temperature so that the medium may contain smectic domains in an isotropic fluid.

Mechanical stress induced alignment is applicable to both the smectic and nematic mesophases. Strong aligning mechanical stress propagates throughout a solid liquid crystalline material due to the natural tendency of these media to self align. Specific mechanical stress methods include stretching a thin film, or coating a liquid crystalline surface with an aligning polymer such as nylon. Physical methods (e.g., stretching) rely upon the rigid and geometrically asymmetric character of certain liquid crystalline molecules to induce bulk orientation. Chemical methods (e.g., coating the surface with an aligning polymer) rely upon strong intermolecular interactions to induce surface orientation. All of the methods described above to produce oriented materials apply to both small molecule liquid crystals and polymeric liquid crystals. For polymers which possess a glass transition, the aligned liquid crystalline phase can be frozen by rapid cooling below the glass transition temperature.

Publications relating to external field-induced liquid crystal molecular orientation include The Physics of Liquid Crystals, P. G. deGennes, p. 95–97, Oxford University Press, 1974; J. Stamatoff et al, "X-Ray Diffraction Intensities of a Smectic-A Liquid Crystal", Phys. Rev. Letters, 44, 1509–1512, 1980; J. S. Patel et al, "A Reliable Method of Alignment for Smectic Liquid Crystals", Ferroelectrics, 59, 137–144, 1984; J. Cognard, "Alignment of Nematic Liquid Crystals and Their Mixtures", Mol. Cryst. Liq. Cryst.: Suppl., 1982; incorporated herein by reference.

The following examples are further illustrative of the present invention. The components and specific ingredients are presented as being typical, and various modifications can be derived in view of the foregoing disclosure within the scope of the invention.

EXAMPLE I

This Example illustrates the preparation of poly[6-(4-nitrobiphenyloxy)hexyl methacrylate] in accordance with the present invention:

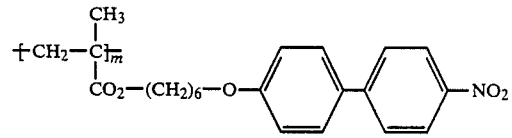

A. 4-Hydroxy-4'-nitrobiphenyl (1) 4-benzoyloxybiphenyl

To 500 ml of pyridine in a 1000 ml three necked flask is added 170 g of 4-hydroxybiphenyl. The mixture is cooled to 10° C., and 155 g of benzoyl chloride is added dropwise while keeping the mixture temperature below 20° C. After complete addition, the mixture is heated gradually to reflux and maintained at this temperature for 30 minutes. The reaction mixture is then cooled to room temperature.

The solidified product subsequently is admixed with 250 ml HCl and 250 ml water, then additional HCl and water are added and the slurry is mixed thoroughly in a blender. The particulate solid is filtered, washed with water to a neutral pH, and air-dried overnight. The crude product is recrystallized from n-butanol, mp 149°-150° C.

(2) 4-benzoyloxy-4'-nitrobiphenyl

4-Benzoyloxybiphenol (40 g) is mixed with 310 ml of glacial acetic acid and heated to 85° C. Fuming nitric acid (100 ml) is added slowly while maintaining the reaction medium temperature between 85°-90° C. After complete addition, the reaction is cooled to room temperature.

The resultant solid is filtered and washed with water and methanol. The crude product is recrystallized from glacial acetic acid, mp 211°-214° C.

(3) 4-Hydroxy-4'-nitrobiphenyl

4-Benzoxyloxy-4'-nitrobiphenyl (60 g) is mixed with 300 ml of ethanol and heated to reflux. A solution of 40 g KOH in 100 ml of water is added dropwise at reflux. After complete addition, the mixture is refluxed 30 minutes and cooled overnight. The resultant blue crystalline potassium salt is filtered and dried.

The dried salt is dissolved in a minimum amount of boiling water, and a 50/50 HCl/water solution is added until an acidic pH is obtained. The crude yellow product is filtered and washed with water until neutral, and then recrystallized from ethanol, mp 203°-204° C.

B. 4-(6-Hydroxyhexyloxy)-4'-nitrobiphenyl

To 400 ml of ethanol is added 21.5 g of 4-hydroxy-4'-nitrobiphenyl and the mixture is heated to reflux. A solution of 7.1 g of KOH in 30 ml of water is added dropwise at reflux temperature. After complete addition, a 21.7 g quantity of 6-bromohexanol is added, and the reaction medium is refluxed about 15 hours. Then the reaction medium is cooled and the ethanol is removed in a rotary evaporator.

The solid residue is slurried with water in a blender, and the particulate solid is filtered, washed with water, and air dried. The crude product is recrystallized from ethanol, mp 117°-119° C.

C. 4-(6-Methacryloxyhexyloxy)-4'-nitrobiphenyl 4-(6-Hydroxyhexyloxy)-4'-nitrobiphenyl (22 g) is dissolved in 500 ml of dry dioxane and heated to 45° C. A 14 g quantity of triethylamine is added, then a solution of 10.5 g of methacryloyl chloride in an equal volume of dioxane is added dropwise while maintaining the reaction medium temperature at 45° C.

The reaction medium is stirred at 45° C. for about 24 hours. The dioxane then is removed under vacuum, and the solid residue is slurried in water in a blender. The particulate solid is filtered, washed with water, and air dried. The crude monomer product is recrystallized from ethanol, mp 53°-56° C.

D. Poly[6-(4-nitrobiphenyloxy)hexyl methacrylate]

The monomer (2 g) is dissolved in 20 ml of degassed benzene in a reactor, and 1 mole percent of azodiisobutyronitrile is added to the reaction medium. The reactor is heated at 60° C. for 4 days. During this period, polymer product separates as a solid precipitate from the reaction medium. After the polymerization is completed, the precipitate is recovered and slurried with methanol in a blender. The solid polymer is filtered, washed with methanol, and vacuum dried.

EXAMPLE II

This example illustrates the preparation of a side chain liquid crystalline polysiloxane polymer in accordance with the present invention.

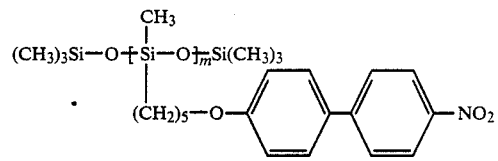

A. 4-(4-Penteneoxy)-4'-nitrobiphenyl

To 400 ml ethanol is added 21.5 g of 4-hydroxy-4'-nitrobiphenyl, and the mixture heated to reflux. A solution of 7.1 g KOH in 30 ml of water is added dropwise at reflux temperatures. After complete addition, 18 g of 5-bromo-1-pentene is added and the reaction medium is heated at reflux temperature for about 15 hours. Ethanol is removed under vacuum from the cooled mixture, and the solid residue is slurried with water in a blender, filtered, washed with water, and air dried. The product then is recrystallized from 90/10 hexane/toluene, mp 74°-76° C.

B. Liquid crystalline polymer formation 4-(4-Penteneoxy)-4'-nitrobiphenyl and poly(methyl hydrogen siloxane) (average M.W., 500-2000) are dissolved in dry toluene, in quantities which provide a 10 mole percent excess of the biphenyl reactant. To this reaction medium is added 1-2 drops of chloroplatinic acid catalyst (5 percent weight/volume in isopropanol).

After heating at 60° C. for about 15 hours, the reaction mixture is poured into methanol to separate a precipitate of solid polymer. The solid polymer is recovered, and purified by dissolving the polymer in chloroform, and precipitating the polymer from solution with methanol.

EXAMPLE III

This example illustrates the preparation of a side chain liquid crystalline polyoxyalkylene polymer in accordance with the present invention.

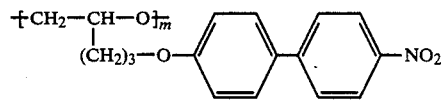

A. 4-(4,5-Epoxypentoxy)-4'-nitrobiphenyl

To 250 ml of methylene chloride is added 28.3 g of 4-(4-pentenoxy)-4'-nitrobiphenyl. The solution is cooled to 0° C., and 18 g of meta-chloroperbenzoic acid is added slowly. The mixture is stirred at 0° C. for 24 hours, and allowed to warm to room temperature.

The solution is filtered, and the filtrate is washed with dilute sodium carbonate, water, and dried over magnesium sulfate. The solvent is removed in a rotary evaporator at room temperature to yield the product as a solid residue.

B. Liquid Crystalline Polymer Formation 4-(4,5-Epoxypentoxy)-4'-nitrobiphenyl (2 g) is dissolved in anhydrous benzene, and heated at 40° C. for 15 hours with boron trifluoride-etherate as a catalyst.

The resultant polyoxypentylene polymer is recovered by precipitation from solution with methanol, and vacuum dried.

The polymer is purified by precipitation from a benzene solution with methanol.

EXAMPLE IV

This Example illustrates a poling procedure for producing a second order nonlinear optical side chain liquid crystalline polymer in accordance with the present invention.

A. Poling Cell Construction

A poling cell is constructed from electrically conductive glass plates, such as Corning Glass EC-2301. The glass plates are washed with sulfuric acid, isopropanol, 1-dodecanol, and isopropanol, with a distilled water rinse between each washing step.

The poling cell is a sandwich type cell in which the conductive glass surfaces are in facing proximity and are separated by a polyimide film of approximately 25 micrometer thickness. A thin layer of epoxy adhesive is applied on the surfaces of the polyimide film to hold the glass plates.

After the epoxy is completely cured, the cell is washed with isopropanol and rinsed with distilled water. After drying, the cell is stored in a dry box.

B. Filling The Poling Cell

Poly[6-(4-nitrobiphenyloxy)hexyl methacrylate] of Example I is placed in a vacuum oven and maintained in a melt phase at a temperature of about 120° C. for about 4 hours to eliminate entrained air bubbles from the polymer melt.

The liquid crystalline polymer melt is introduced into the space between the glass plates by charging a drop of the polymer melt to one of the openings of the poling cell space and placing the cell assembly in a vacuum oven maintained at a temperature approximately 10° C. above the clearing temperature of the liquid crystalline polymer. The cell space fills gradually by capillary action. The space filling period is about 4 hours for a 0.5 cm long space. The liquid crystalline polymer melt in the filled cell is bubble-free.

C. Electric Field Induced Orientation

Two lead wires are attached to each of the conductive glass surfaces using electrically conductive epoxy adhesive. The poling assembly is placed in a microscope hot stage (Mettler FP-82 with FP-80 Central Processor), and the sample is observed with a polarizing microscope (Leitz Ortholux Pol) for alignment.

The microscope is switched into a photodiode (Mettler Photometer No. 17517) to record the change of light intensity upon application of an electric field. The two lead wires are connected to an AC voltage amplifier (Electro-Optic Developments LA10A), which amplifiers the voltage signal from a signal generator (Hewlett-Packard No. 3310B).

The poling cell first is heated to 85° C. to bring the liquid crystal polymer to the isotropic phase. The assembly then is cooled at a rate of 0.2° C./min, until it reaches 64° C. At this temperature, the photodiode signal registers an abrupt increase which indicates that the melt has undergone a transition into a liquid crystalline phase. The temperature is further lowered by 2° C. and then maintained at this temperature.

The AC voltage source is set at 500 V, and the frequency is set at 2000 Hz. The power to the poling cell is turned on to apply an electric field across the liquid crystalline sample. The field strength is calculated to be approximately $2\times 10^5$ V/cm. About three seconds after the electric field is applied, the photodiode signal drops close to the baseline, indicating that orientation development induced by the electric field is completed. At this point, the cooling is resumed until the temperature reaches 35° C., and the poling assembly is disconnected from the power source.

When the poling assembly is removed from the microscope hot stage, by visual observation the liquid crystalline polymer in the cell space is transparent. This is an indication that the molecular orientation is uniform and homogeneous throughout the sample. Orientation of the sample is further ascertained utilizing a wide angle X-ray diffraction technique, and the Hermann's orientation factor of the sample is approximately 0.9.

D. High Field Poling For Symmetry Control

The oriented liquid crystal sample is subjected further to a higher electric field to develop a noncentrosymmetric orientation of nonlinear optical moieties which are a part of the side chains of the polymer.

The poling cell assembly is heated to 30° C., which is approximately 5° C. below the glass transition temperature of the polymer. Then the lead wires of the poling assembly are connected to a DC voltage source (Kepco OPS-3500) and the voltage is turned up slowly until it reaches 2000 V. At this point, the electric field strength across the sample is about $8\times 10^5$ V/cm. The sample is maintained at this field strength level for 24 hours, and then the voltage source is disconnected. A noncentrosymmetrically oriented liquid crystalline polymer matrix is obtained when the cell sample is cooled.

The noncentrosymmetry of the sample is determined from the wide angle X-ray diffraction measurement and the thermally stimulated electrical discharge measurement. The Hermann's orientation function from the X-ray measurement is approximately 0.9.

From the measurements, there is an indication that a major proportion of the nonlinear optical moieties are aligned parallel to the electric field direction, and the rest are oriented antiparallel to the electric field direction.

What is claimed is:

1. A thermotropic liquid crystalline polymer which is characterized by a recurring monomeric unit corresponding to the formula:

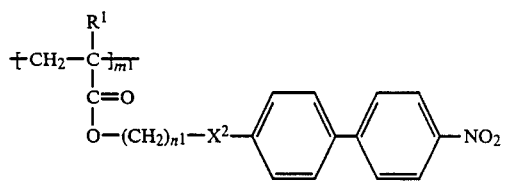

where $m^1$ is an integer of at least 5;

$n^1$ is an integer between about 4–20;

$X^2$ is —$NR^1$—, —O— or —S—; and $R^1$ is hydrogen or methyl.

2. A liquid crystalline polymer in accordance with claim 1 wherein $X^2$ is —NH—.

* * * * *